US009878638B2

(12) United States Patent
Wein et al.

(10) Patent No.: US 9,878,638 B2
(45) Date of Patent: Jan. 30, 2018

(54) METHOD FOR OPERATING A DRIVE DEVICE OF A MOTOR VEHICLE AND CORRESPONDING DRIVE DEVICE

(71) Applicant: AUDI AG, Ingolstadt (DE)

(72) Inventors: Michael Wein, Seubersdorf (DE); Karl-Heinz Meitinger, München (DE)

(73) Assignee: AUDI AG, Ingolstadt (DE)

( * ) Notice: Subject to any disclaimer, the term of this patent is extended or adjusted under 35 U.S.C. 154(b) by 177 days.

(21) Appl. No.: 14/787,096

(22) PCT Filed: Apr. 17, 2014

(86) PCT No.: PCT/EP2014/001048
§ 371 (c)(1),
(2) Date: Oct. 26, 2015

(87) PCT Pub. No.: WO2014/173517
PCT Pub. Date: Oct. 30, 2014

(65) Prior Publication Data
US 2016/0075257 A1    Mar. 17, 2016

(30) Foreign Application Priority Data
Apr. 27, 2013 (DE) .......................... 10 2013 007 354

(51) Int. Cl.
*B60L 15/20*    (2006.01)
*B60L 15/32*    (2006.01)
(Continued)

(52) U.S. Cl.
CPC ................ *B60L 15/32* (2013.01); *B60K 1/02* (2013.01); *B60L 11/18* (2013.01);
(Continued)

(58) Field of Classification Search
CPC ............. B60L 15/2036; B60L 15/2045; B60L 15/2054; B60L 15/20; B60L 15/32;
(Continued)

(56) References Cited

U.S. PATENT DOCUMENTS 6,852,054 B2 *  2/2005  Tumback ............... B60K 6/365
                                                          180/65.235
7,128,680 B2 * 10/2006  Holmes .................. B60K 6/365
                                                          475/10
(Continued)

FOREIGN PATENT DOCUMENTS

CN        102343799        2/2012
DE    2006 009 296 A1      9/2007
(Continued)

OTHER PUBLICATIONS

Chinese Search Report dated Aug. 12, 2016 with respect to counterpart Chinese patent application 201480022910.8.
(Continued)

*Primary Examiner* — James A Shriver, II
*Assistant Examiner* — Steve Clemmons
(74) *Attorney, Agent, or Firm* — Henry M. Feiereisen LLC

(57) ABSTRACT

A method for operating a drive device is disclosed. The drive device has manual transmission has an intermediate shaft operatively connected with an output shaft, and a countershaft. In a first acceleration operating mode of the drive device a first electric motor and a second electric motor of the drive device are operatively connected with the intermediate shaft via the countershaft, and in a second acceleration operating mode the first electric motor is directly connected with the intermediate shaft and the second electric motor is operatively connected with the intermediate shaft via the countershaft. When switching between the first (Continued)

acceleration operating mode and the second acceleration operating mode the operative connection between the first electric motor and the intermediate shaft is interrupted for a defined switching time period. During the switching time period the second electric motor is operated with an overload torque.

16 Claims, 1 Drawing Sheet

(51) Int. Cl.
    *B60L 11/18*     (2006.01)
    *B60K 1/02*     (2006.01)
    *B60W 10/08*     (2006.01)
    *B60W 30/18*     (2012.01)

(52) U.S. Cl.
    CPC ........... *B60L 11/1803* (2013.01); *B60L 15/20* (2013.01); *B60L 15/2036* (2013.01); *B60L 15/2045* (2013.01); *B60L 15/2054* (2013.01); *B60W 10/08* (2013.01); *B60W 30/18* (2013.01); *B60L 2220/14* (2013.01); *B60L 2220/42* (2013.01); *B60L 2220/46* (2013.01); *B60L 2240/421* (2013.01); *B60L 2240/423* (2013.01); *B60L 2240/425* (2013.01); *B60L 2240/486* (2013.01); *B60L 2240/507* (2013.01); *B60L 2240/662* (2013.01); *B60L 2240/80* (2013.01); *B60L 2260/167* (2013.01); *B60L 2260/26* (2013.01); *B60L 2270/145* (2013.01); *Y02T 10/645* (2013.01); *Y02T 10/648* (2013.01); *Y02T 10/7005* (2013.01); *Y02T 10/72* (2013.01); *Y02T 10/7283* (2013.01); *Y02T 10/7291* (2013.01); *Y02T 90/16* (2013.01)

(58) Field of Classification Search
    CPC ............. B60L 2260/20; B60L 2260/26; B60L 2260/167; B60L 2240/421; B60L 2240/423; B60L 2240/425; B60L 2240/486; B60L 2240/507; B60W 10/08; B60W 30/18; B60K 1/02
    See application file for complete search history.

(56) References Cited

U.S. PATENT DOCUMENTS

| | | | | |
|---|---|---|---|---|
| 7,192,373 B2 * | 3/2007 | Bucknor | ................ | B60K 6/445 180/65.22 |
| 7,826,940 B2 * | 11/2010 | Miranda | ................ | B60K 6/48 180/65.1 |
| 8,012,057 B2 * | 9/2011 | Meixner | ................ | B60K 17/16 475/150 |
| 8,322,729 B2 | 12/2012 | Michel et al. | | |
| 8,371,593 B2 | 2/2013 | Michel et al. | | |
| 8,474,837 B2 | 7/2013 | Meitinger et al. | | |
| 8,490,983 B2 | 7/2013 | Schmid et al. | | |
| 8,534,684 B2 | 9/2013 | Michel et al. | | |
| 8,565,973 B2 | 10/2013 | Wein | | |
| 8,573,617 B2 | 11/2013 | Meitinger et al. | | |
| 8,645,026 B2 | 2/2014 | Bär et al. | | |
| 8,731,759 B2 | 5/2014 | Wein et al. | | |
| 8,731,780 B2 | 5/2014 | Michel et al. | | |
| 8,738,266 B2 | 5/2014 | Kruse et al. | | |
| 8,746,713 B2 | 6/2014 | Meitinger et al. | | |
| 8,801,107 B2 | 8/2014 | Schmid et al. | | |
| 8,831,859 B2 | 9/2014 | Meitinger et al. | | |
| 8,857,921 B2 | 10/2014 | Schmid et al. | | |
| 8,894,077 B2 | 11/2014 | Michel et al. | | |
| 8,955,345 B2 | 2/2015 | Meitinger et al. | | |
| 9,162,582 B2 | 10/2015 | Meitinger et al. | | |
| 9,387,752 B2 * | 7/2016 | Puiu | ................ | B60K 6/365 |
| 9,421,882 B2 * | 8/2016 | Kato | ................ | B60L 3/0076 |
| 9,580,065 B2 * | 2/2017 | Bangura | ................ | F16H 37/065 |
| 2003/0027682 A1 | 2/2003 | Schmidt et al. | | |
| 2005/0067202 A1 | 3/2005 | Shimizu | | |
| 2007/0188125 A1 | 8/2007 | Shepard | | |
| 2009/0200094 A1 | 8/2009 | Zohrer et al. | | |
| 2013/0041545 A1 | 2/2013 | Bär et al. | | |
| 2013/0131920 A1 | 5/2013 | Meitinger et al. | | |
| 2013/0175776 A1 | 7/2013 | Michel et al. | | |
| 2013/0218414 A1 | 8/2013 | Meitinger et al. | | |
| 2013/0345019 A1 | 12/2013 | Kaltenbach et al. | | |
| 2014/0024467 A1 | 1/2014 | Meitinger | | |

FOREIGN PATENT DOCUMENTS

| | | | | |
|---|---|---|---|---|
| DE | 602 23 631 T2 | 10/2008 | | |
| DE | 2009 007 972 U1 | 6/2010 | | |
| DE | 2011 005 451 A1 | 9/2012 | | |
| DE | 102013210012 A1 * | 6/2014 | ................ | B60K 6/48 |
| DE | 2013 005 721 A1 | 10/2014 | | |
| EP | 2 386 782 A2 | 11/2011 | | |
| EP | 2 450 597 A1 | 5/2012 | | |
| EP | 2450597 A1 * | 5/2012 | ................ | B60L 11/123 |
| FR | 2976526 A1 * | 12/2012 | ................ | B60K 1/02 |
| WO | WO 2006/034520 A1 | 4/2006 | | |

OTHER PUBLICATIONS

Translation of Chinese Search Report dated Aug. 12, 2016 with respect to counterpart Chinese patent application 201480022910.8.
International Search Report issued by the European Patent Office in International Application PCT/EP2014/001048.

* cited by examiner

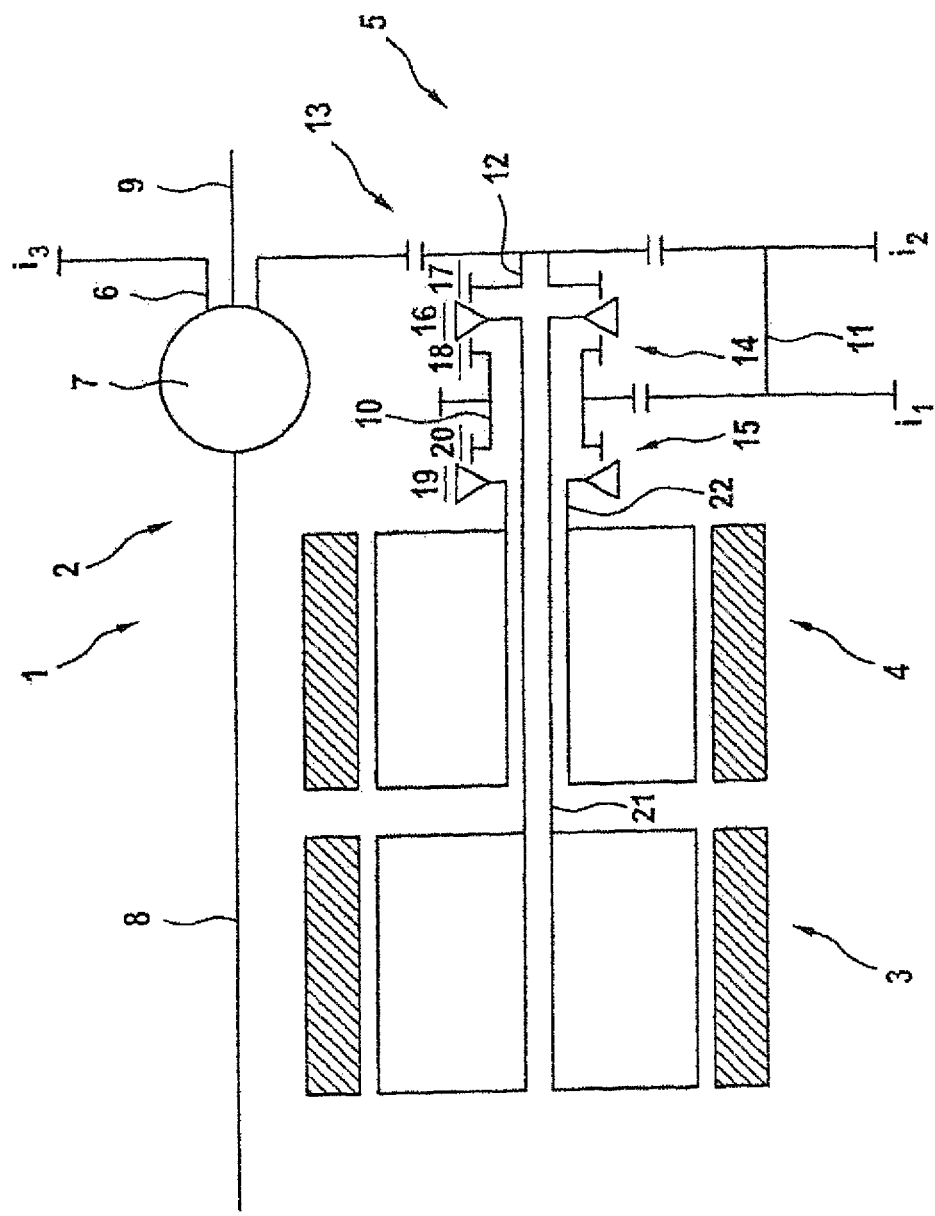

METHOD FOR OPERATING A DRIVE DEVICE OF A MOTOR VEHICLE AND CORRESPONDING DRIVE DEVICE

CROSS-REFERENCES TO RELATED APPLICATIONS

This application is the U.S. National Stage of International Application No. PCT/EP2014/001048, filed Apr. 17, 2014, which designated the United States and has been published as International Publication No. WO 2014/173517 and which claims the priority of German Patent Application, Serial No. 10 2013 007 354.5, filed Apr. 27, 2013, pursuant to 35 U.S.C. 119(a)-(d).

BACKGROUND OF THE INVENTION

The invention relates to a method for operating a drive device of a motor vehicle, which drive device has a drive shaft, which is operatively connected with at least one wheel of the motor vehicle, a first electric motor, a second electric motor and a manual transmission, wherein for acceleration of the motor vehicle the first electric motor is operated with a first maximal torque and the second electric motor is operated with a second maximal torque. The invention also relates to a drive device of a motor vehicle.

The drive device serves for outputting a torque, for example via the drive shaft. The torque serves in particular for driving the motor vehicle, wherein the drive device provides a torque, which is directed toward driving the motor vehicle, and which acts on the at least one wheel. Correspondingly the drive device can be assigned to a wheel axle of the motor vehicle on which the at least one wheel of the motor vehicle, in particular, however, at least two wheels of the motor vehicle, are provided. The drive device includes two electric machines, i.e., the first electric motor and the second electric motor, which at least temporarily generate the above-described torque together. Beside the two electric machines the drive device includes the manual transmission device.

Known drive devices either have one or multiple electric motors, which are operatively connected with the wheel axle of the motor vehicle or with individual wheels of the motor vehicle. The electric motor or the electric motors are controlled by means of an inverter, which however has a limited power output. For example due to predetermined maximal current strengths and/or predetermined maximal voltages, the inverters or the known drive devices are subject to certain limitations. When only a single electric motor is provided for driving the wheel axle, the power cannot be increased unlimitedly due to the limitations of the inverter. For this reason a respective electric motor can be assigned to the (multiple) wheels of the wheel axle. This increases the available power when both electric motors are operated, however, this also has several functional disadvantages. In particular the entire power can no longer be redirected to an individual wheel, for example by means of torque vectoring.

In addition it is possible to cause multiple electric motors to act on the wheel axle. In case of a direct coupling of the electric motors, however, a rotational speed or a rotary field uniformity has to be ensured by the inverters of the two electric motors. In this case the sum of the power of the electric motors is available on the wheel axle. A disadvantage is, however, that the electric motors always run with the same rotational speed and insofar are always operated at same operating points. As a result at a low overall transmission ratio between the electric motors and the wheel axle or the wheels of the motor vehicle, only a small torque is available at the wheel axle or the wheels.

SUMMARY OF THE INVENTION

It is an object of the invention to propose a method for operating a drive device by means of which a great torque can be provided on the output shaft and in addition a high efficiency can be achieved, in particular when accelerating the motor vehicle over a wide operating range.

According to the invention, this is achieved with a method with the features of the independent method claim. Hereby it is provided that the manual transmission has an intermediate shaft, which is operatively connected with the output shaft, and a countershaft, wherein in a first acceleration operating mode the first electric motor and the second electric motor are operatively connected with the intermediate shaft via the countershaft, and in a second acceleration operating mode the first electric motor is directly connected with the intermediate shaft and the second electric motor is operatively connected with the intermediate shaft via the countershaft, and when switching between the first acceleration operating mode and the second acceleration operating mode the operative connection between the first electric motor and the intermediate shaft is interrupted for a defined switching time period, wherein the first electric motor during the switching time period is operated with an overload torque, which is greater than the second maximal torque, for at least partially compensating the torque provided by the first electric motor.

Thus in addition to the output shaft, the drive has further shafts, i.e., the intermediate shaft and the countershaft. The intermediate shaft is hereby operatively connected with the output shaft, in particular directly operatively connected. It can also be provided that the intermediate shaft is a part of the output shaft or is formed together with the output shaft. This is not the case for the countershaft. For the countershaft only an indirect operative connection with the output shaft is realized, in particular via the intermediate shaft. This means that a torque acting on the countershaft is first transmitted to the intermediate shaft and only thereafter to the output shaft. However, according to the above description, the intermediate shaft can be a component of the output shaft or be formed by the output shaft.

The manual transmission device enables realizing multiple operating modes, wherein the following discussion substantially focuses on the two acceleration operating modes. In the first acceleration operating mode, the first electric motor and the second electric motor are only indirectly operatively connected with the intermediate shaft, i.e., via the countershaft. The first electric motor and the second electric motor thus drive the countershaft, via which eventually the torque of the electric motors is transmitted to the intermediate shaft. In the second acceleration operating mode on the other hand, the first electric motor is directly operatively connected with the intermediate shaft. The operative connection between the second electric motor and the intermediate shaft, however, still remains to be only indirect via the countershaft.

For accelerating the motor vehicle, the electric motors are operated with their respective maximal torque, so that a maximal acceleration is achieved. For this purpose the first maximal torque is determined for the first electric motor and the second maximal torque is determined for the second electric motor. During the acceleration it is provided to switch between the acceleration operating modes, in particular from the first acceleration operating mode to the second acceleration operating mode. The switching enables changing the transmission ratio between the first electric motor and the intermediate shaft. For example when in the first acceleration operating mode a first coupling transmission ratio is present between the first electric motor and the second electric motor on one hand and the intermediate shaft or the countershaft on the other hand, a second coupling transmission ratio between the first electric motor on one hand and the intermediate shaft and thus the output shaft on the other hand is realized in the second acceleration operating mode, which second coupling transmission ratio is different from the first coupling transmission ratio.

During the switching the operative connection between the first electric motor and the intermediate shaft is interrupted for the defined switching time period, so that the first electric motor is no longer available for the acceleration of the motor vehicle or the provision of a corresponding torque. This results in an interruption of traction, which is negatively perceived by the driver and manifests itself for example in the form of a jerking of the motor vehicle. Because the electric motors are already operated with their maximal torques the absences of the torque of the first electric motor cannot easily be compensated. However, because the switching time period lasts for only a short period of time it is permissible to operate the second electric motor with a torque that exceeds the second maximal torque. This torque is referred to as overload torque. The overload torque is for example selected so that the overload torque would cause damage to the second electric motor if the second electric motor was permanently operated with the overload torque. However, due to the short duration of the switching time period such damage does not occur when operating the second electric motor with the overload torque for at least partially compensating the torque that is normally provided by the first electric motor.

The above-described procedure is in particular useful when the first electric motor and the second electric motor are configured differently, i.e., when they are realized as different motor types. For example the first electric motor is configured as synchronous machine, in particular as permanently excited synchronous machine, while the second electric motor is realized as asynchronous machine. Of course the first and the second electric motor can also be configured identical and can be configured as synchronous machine, in particular as permanently excited synchronous machine, or as asynchronous machine. The synchronous machine can be operated with a high reduction gear ratio and also with a low reduction gear ratio in order to provide a torque at good efficiency. Generally the synchronous machine may however be operated with lower torques than the asynchronous machine.

Beside the acceleration operating modes described above, the manual transmission device can also be configured for implementing further operating modes, wherein in a first operating mode and a second operating mode only one of the electric motors, i.e., either the first electric motor or the second electric motor, is operatively connected with the output shaft. This means that in the first operating mode the second electric motor is completely decoupled from the output shaft and in the second operating mode the first electric motor is completely decoupled from the output shaft, i.e., has no operative connection to the output shaft. Thus no torque is transmitted between the respective electric motor and the output shaft.

On the other hand, in a third operating mode the first and the second electric motor are coupled simultaneously with the output shaft, wherein hereby different coupling transmission ratios are present between the electric motors and the output shaft, in particular at least temporarily. This means that the manual transmission device is configured so that in the third operating mode the first coupling transmission ratio and the second coupling transmission ratio are preferably different from each other, however, they can also be the same. On the other hand, it can also be provided that in the third operating mode always different coupling transmission ratios are present, while in a fourth operating mode the first electric motor and the second electric motor are operatively connected with the output shaft with coupling transmission ratios that correspond to each other. In such a configuration the fourth operating mode corresponds to the first acceleration operating mode and the third operating mode corresponds to the second acceleration operating mode.

In a particularly preferred configuration of the method according to the invention it is provided in a third operating mode that the second coupling transmission ratio corresponds to the second transmission ratio, while the first coupling transmission ratio is different from the first transmission ratio or alternatively corresponds to the first transmission ratio. With such a configuration of the drive device it is possible to configure the manual transmission device in dependence on an operating mode of the drive device so that each of the two electric motors is either turned off or is operated with high efficiency. The operating state of the drive device is for example characterized by the rotational speed of the output shaft and/or a load torque applied to the output shaft.

It can be provided that in the first operating mode the intermediate shaft is operatively connected only with the second electric motor and in the third and the fourth operating mode with the first and the second electric motor. The operative connection can hereby respectively be direct or indirect. In the first case it is sufficient that the intermediate shaft is driven by the respective electric motor. In the case of the direct operative connection, preferably a direct coupling between the respective electric motor and the intermediate shaft is provided, in which in particular the rotational speed of the respective electric motor corresponds to the rotational speed of the intermediate shaft. Preferably the operative connection is direct in the first operating mode and indirect in the second operating mode.

In a preferred embodiment of the invention it is provided that the intermediate shaft is permanently operatively connected with the output shaft via an intermediate transmission. While it can of course be provided that the intermediate shaft is directly connected with the output shaft or even constitutes the output shaft, the intermediate transmission is preferably arranged in the operative connection between the intermediate shaft and the output shaft. By means of the transmission gearing a transmission ratio between the intermediate shaft and the output shaft is realized, which is preferably different from one, so that when a rotational speed of the intermediate shaft is given, the output shaft has a rotational speed that is different from this given rotational speed. The operative connection between the intermediate shaft and the output shaft is preferably permanent, i.e., not releasable or shiftable.

In a refinement of the invention the output shaft is an input shaft of an axle differential. The drive device serves in particular for driving the wheel axle of the motor vehicle. This wheel axle is for example assigned the axle differential. The axle differential has an input shaft and two output shafts, wherein in this case the output shaft is the input shaft or is at least directly coupled to the input shaft. Each output shaft of the axle differential is preferably assigned at least one wheel of the motor vehicle or is operatively connected with the respective output shaft.

A further embodiment of the invention provides that directly after the switching, the torque of the second electric motor is reduced, in particular to or below the second maximal torque. The operation of the second electric motor with the overload torque is thus actually only provided during the switching time period. In this way load-related damage to the second electric motor is avoided. The reducing of the torque provided by the second electric motor is immediately initiated after expiration of the switching tome period. Hereby the torque is preferably reduced to the second maximal torque or even below the second maximal torque. Particularly preferably this reduction is not abrupt but rather controlled and/or regulated so that the desired output torque is always available at the output shaft. For example the torque of the first electric motor is continuously increased after expiration of the switching time period, while the torque of the second electric motor is reduced, in particular to the second maximal torque, so that overall or in sum the desired output torque is always provided.

In a refinement of the invention, the overload torque is selected in dependence on the duration of the switching time period. The operation of the second electric machine with the overload torque is only permissible within a limited period of time in order to avoid damage. This time period is the shorter the higher the overload torque is. Correspondingly the overload torque is calculated in dependence on the (known) duration of the switching time period so as to prevent damage to the second electric motor. In the calculation at least one further variable can be taken into account, for example a state variable such as the ambient temperature and/or the temperature of the second electric motor. The lower this temperature, the greater the overload torque can be selected.

In a further preferred embodiment of the invention, the first maximal torque and/or the second maximal torque are selected so that the torque of the first electric motor can be completely compensated during the switching. This can in particular mean not to provide the theoretically possible maximal torque to the driver of the motor vehicle because the interruption of traction during the switching has to be avoided. Correspondingly the first maximal torque, the second maximal torque or both maximal torques have to be selected correspondingly low so that the difference between the overload torque and the second maximal torque corresponds to the first maximal torque. Preferably the first maximal torque is actually selected maximal, i.e., so that during the acceleration of the motor vehicle the maximal power is provided over a limited period of time. The second maximal torque on the other hand is adjusted toward smaller torques so that the absence of the first maximal torque during the switching time period can be fully compensated by operating the second electric motor with the overload torque.

A further embodiment of the method provides that a permanent operating torque for each of the electric motors, the first maximal torque the second maximal torque and the overload torque, are permanently determined. This is for example implemented by means of a control device of the drive device. The permanent operating torque is the torque with which the corresponding electric motor can be permanently operated, i.e., over an indeterminate period of time, without expecting load-related damage. The permanent operating torque depends for example on at least one variable, in particular the ambient temperature and or the temperature of the respective electric motor. The maximal torques on the other hand correspond to the torques with which the respective electric motor can be operated over a defined, relatively short period of time, again without expecting load-related damage. The time period is preferably selected so that a typical acceleration process of the motor vehicle can be completed. In particular it is 10 seconds to 60 seconds, 20 seconds or 30 seconds to 40 seconds. Correspondingly, the overload torque is a torque, which is determined analogously to the maximal torque, however, for a significantly shorter period of time. For example the time period for the overload torque is at most 1 second, at most 0.5 seconds, at most 0.25 seconds or at most 0.1 seconds.

A further refinement of the invention provides that the first maximal torque or the second maximal torque is selected to be at least 25%, at least 50%, at least 75% or at least 100% greater than the permanent operating torque of the respective electric motor. Hereby in particular the aforementioned boundary conditions are taken into account, according to which load-related damage is to be avoided.

In a further preferred embodiment it is provided that the overload torque is selected to be at least 25%, at least 50%, at least 75% or at least 100% greater that the second maximal torque. Also in this regard reference is made to the above discussion.

The invention also relates to a drive device of a motor vehicle, in particular for implementing the method according to the description above, wherein the drive device has an output shaft operatively connected with at least one wheel of the motor vehicle, a first electric motor, a second electric motor and a manual transmission device. For accelerating the motor vehicle, the first electric motor is operated with a first maximal torque and the second electric motor with a second maximal torque. The drive device is characterized in that the manual transmission device has an intermediate shaft operatively connected with the output shaft, and a countershaft, wherein in a first acceleration operating mode the first electric motor and the second electric motor are operatively connected with the intermediate shaft via the countershaft and in a second acceleration operating mode the first electric motor is directly operatively connected with the intermediate shaft and the second electric motor is operatively connected with the intermediate shaft via the countershaft, and wherein during a shifting between the first acceleration operating mode and the second acceleration operating mode the operative connection between the first electric motor and the intermediate shaft is interrupted for a defined switching time period, wherein the drive device is configured to operate the second electric motor during the switching time period with an overload torque to at least partially compensate the torque provided by the first electric motor, the overload torque being greater than the second maximal torque. The advantages of such a process and such a drive device were already mentioned above. The drive device and the corresponding method can be refined according to the above explanations so that reference is made to these explanations.

In a particularly preferred embodiment of the invention, it is provided that a first clutch is assigned to the first electric motor and a second clutch is assigned to the second electric motor. The two clutches serve for setting the different operating modes of the manual transmission device. Insofar the clutches are a component of the manual transmission device. The clutches serve in particular for generating the operative connection between the respective electric motor and the output shaft.

A refinement of the invention provides that a first shifting position of the first clutch assigned to the first electric motor is configured as freewheel position, in a second shifting position of the first clutch a direct operative connection between the first electric motor and the intermediate shaft is present, and in a third shifting position of the first clutch the operative connection between the first electric motor and the intermediate shaft is formed via the countershaft. Overall the first clutch can thus assume at least three shifting positions. The first shifting position is a freewheel position. This means that in this position the first electric motor is completely decoupled from the output shaft. In the second shifting position the first clutch generates the direct operative connection between the first electric motor and the intermediate shaft. As mentioned above, the term operative connection means in particular that the first electric motor directly engages on the intermediate shaft or the first electric motor and the intermediate shaft at least have the same rotational speed.

In the third shifting position the operative connection between the first electric motor and the intermediate shaft is formed only indirectly, i.e., via the countershaft. The first electric motor thus does not directly engage on the intermediate shaft, but first drives the countershaft, which in turn is connected to the intermediate shaft. Hereby for example a first partial transmission is present between the first electric motor and the countershaft and a second partial transmission is present between the countershaft and the intermediate shaft. Thus the transmission ratio between the first electric motor and the intermediate shaft is different in the second shifting position compared to the transmission ratio present in the third shifting position.

A further embodiment of the invention provides that a first shifting position of the clutch assigned to the second electric motor is configured as freewheel position and in a second shifting position of the second clutch an operative connection between the second electric motor and the intermediate shaft is generated via the countershaft. Thus at least two shifting positions are realized by means of the second clutch, in particular exactly two shifting positions. The first shifting position of the second clutch, like the first shifting position of the first coupling, is a freewheel position, so that in this position the second electric motor is completely decoupled from the output shaft. In the second shifting position of the second clutch on the other hand the second electric motor is operatively connected with the countershaft and via the countershaft with the intermediate shaft. According to the explanations above the first partial transmission can be present between the second electric motor and the countershaft and the second partial transmission between the countershaft and the intermediate shaft.

A preferred embodiment of the invention is characterized by a connecting shaft which in the third shifting position of the first clutch is directly operatively connected with the first electric motor and in the second shifting position of the second clutch with the second electric motor. The connecting shaft is thus either drivable with the first electric motor, with the second electric motor or with both simultaneously. The connecting shaft is not directly operatively connectable with the intermediate shaft, but only indirectly via the countershaft, wherein the first partial transmission described above is for example present between the connecting shaft and the countershaft and the second partial transmission is present between the countershaft and the intermediate shaft.

Finally it can also be provided that a first partial transmission is present between the connecting shaft and the countershaft and a second partial transmission is present between the countershaft and the intermediate shaft. As explained above the connecting shaft is only indirectly operatively connected with the intermediate shaft. Hereby a rotational speed or torque conversion occurs corresponding to the first partial transmission and the second partial transmission. The first partial transmission is hereby preferably different from the second partial transmission, however it can also be the same.

BRIEF DESCRIPTION OF THE DRAWING

In the following, the invention is explained in more detail by way of exemplary embodiments shown in the drawings, without limiting the invention. Hereby the sole FIGURE shows a schematic representation of a drive with a first electric motor and a second electric motor and a manual transmission.

DETAILED DESCRIPTION OF PREFERRED EMBODIMENTS

The FIGURE shows a schematic representation of a drive device 1, which for example serves for driving a motor vehicle or a wheel axle 2 of the motor vehicle. For this purpose the drive device 1 has a first electric motor 3 and a second electric motor 4. These are operatively connectable individually or together with an output shaft 6 via a manual transmission device 5. This output shaft 6 is for example operatively connected, preferably permanently, with the wheel axle 2 or with a first partial wheel axle 8 and a second partial wheel axle 9 via an axle differential 7.

The manual transmission device 5 has a connecting shaft 10, a countershaft 11 and an intermediate shaft 12. The connecting shaft 10 is permanently operatively connected with the countershaft 11 and the countershaft with the intermediate shaft 12. Hereby a first partial transmission with a transmission ratio $i_1$ is present between the connecting shaft 10 and the countershaft 11 and a second partial transmission with the transmission ratio $i_2$ is present between the countershaft 11 and the intermediate shaft 12. The intermediate shaft 12 is for example permanently operatively connected with the output shaft 6 via an intermediate transmission 13 with the transmission ratio i3.

The manual transmission device 5 has a first clutch 14 and a second clutch. The first clutch 14 can be caused to assume a first shifting position 16, a second sifting position 17 and a third shifting position 18, which is here only indicated schematically. The second clutch 15 can be operated in a first shifting position 19 and in a second shifting position 20, which are here also only indicated schematically. For example the clutches 14 and 15 each have, here not shown, selector sleeves, by means of which a motor shaft 21 of the first electric motor 3 or a motor shaft 22 of the second electric motor can either be decoupled from the output shaft 6 or coupled with the output shaft 6 via a defined transmission ratio.

For example it is provided that the first shifting position 16 of the first clutch 14 corresponds to a freewheel position in which the first electric motor 3 or its motor shaft 21 is completely decoupled from the output shaft 6. In the second shifting position 17 of the first clutch 14 on the other hand a direct operative connection between the first electric motor 3 or the motor shaft 21 and the intermediate shaft 12 is present. In the third shifting position 18 of the first clutch 14 on the other hand a direct operative connection between the first electric motor 3 and the connecting shaft 10 is present so that an operative connection between the first electric motor 3 and the intermediate shaft 12 is provided via the connecting shaft 10 and the countershaft 11.

This means that in the second shifting position 17 the intermediate shaft 12 has the same rotational speed as the first electric motor 3 or that a transmission ratio of 1=1 is realized. In the third shifting position 18 on the other hand a transmission ratio of $i=i_1 \cdot i_2$ is present, wherein the transmission ratios $i_1$ and $i_2$ are preferably different from each other, however they can also be identical. In particular at least one of the transmission ratios $i_1$ and $i_2$, preferably both, is different from one. Thus a transmission ratio between the first electric motor 3 and the output shaft 6 of $i=i_3$ results in the second shifting position, and in the third shifting position 18 a transmission ratio of $i=i_1 \cdot i_2 \cdot i_3$.

In the first shifting position 19 of the second coupling 15 a freewheel is again realized so that the second electric motor 4 is completely decoupled from the output shaft 6. In the second shifting position 20 of the second coupling 15 in the other hand a direct operative connection between the second electric motor 4 and the connecting shaft 10 is present so that correspondingly an operative connection between the second electric motor 4 and the output shaft 6 is realized via the connecting shaft 10, the countershaft 11 and the intermediate shaft 12. From this a transmission ratio of $i=i_1 \cdot i_2 \cdot i_3$ between the second electric motor 4 and the output shaft 6 results in the second shifting position 20 of the second coupling 15.

Correspondingly in a first operating mode of the manual transmission device 5 an operative connection between the first electric motor 3 and the output shaft 6 with a first transmission ratio can be present with the second electric motor being decoupled from the output shaft 6, while in the second operating mode an operative connection between the second electric motor 4 and the output shaft 6 is realized with a second transmission ratio, with the first electric motor 3 being decoupled from the output shaft 6. Because the first electric motor 3 can be connected to the output shaft 6 with different transmission ratios the first transmission ratio can correspond to the second transmission ratio or can be different from the second transmission ratio.

In a third operating mode of the manual transmission device 5 it is provided that the first electric motor 3 as well as the second electric motor 4 are operatively connected with the output shaft 6. Hereby a first coupling transmission ratio is present between the first electric motor 3 and the output shaft 6 and a second coupling transmission ratio is present between the second electric motor and the output shaft 6. The second coupling transmission ratio corresponds preferably always to the second coupling transmission ratio. The first coupling transmission ratio on the other hand is preferably selectable and hereby either corresponds to the first transmission ratio or the second transmission ratio. For example the first coupling transmission ratio and the second coupling transmission ratio are different from each other in a third operating mode and are the same in a fourth operating mode.

With this a very flexible operating behavior can be achieved with the described drive device 1. Even more so when the first electric motor 3 is constructed differently from the second electric motor 4. For example the first electric motor 4 is constructed as a synchronous machine, in particular a permanently excited synchronous machine. The second electric motor 4 on the other hand can be realized as asynchronous machine. Of course the first electric motor 3 and the second electric motor 4 can also be constructed identically, for example as synchronous machine, in particular as permanently excited synchronous machine or as asynchronous machine. The synchronous machine can be operated with a high reduction ratio and also with a low reduction ratio, in order to provide a high torque at good efficiency. Generally the synchronous machine may, however, only be operated with lower rotational speeds than the asynchronous machine.

It can be provided to operate the drive device 1 so that the manual transmission device 5 is configured in dependence on an actual operating state of the drive device so that the electric motors 3 and 4 are either turned off or are operated with high efficiency. For example in case of a low load (a load moment acting on the output shaft 6 is smaller than a torque threshold) but high rotational speed (a rotational speed for the output shaft 6 is greater than a second rotational speed threshold) the second operating mode of the manual transmission device 5 is selected in which the second electric motor 4, but not the first electric motor 3 is operatively connected with the output shaft 6. For this purpose the second shifting position 20 and the first shifting position of the clutches 14 and 15 are selected. A transmission ratio between the second electric motor 4 and the output shaft 6 is $i=i_1 \cdot i_2 \cdot i_3$.

At low load (the load torque is smaller than the rotational speed threshold) and low rotational speed (the rotational speed is smaller than a first rotational speed threshold which is smaller than the second rotational speed threshold) the first electric motor 3 is operatively connected with the output shaft 6, while the second electric motor 4 is decoupled from the output shaft 6. For this purpose the third shifting position 18 and the first shifting position 19 are set at the clutches 14 and 15. Between the first electric motor 4 and the output shaft 6 again the transmission $i=i_1 \cdot i_2 \cdot i_3$ is present. When the rotational speed is now increased at low load and is for example between the first and second rotational speed threshold, the first clutch 14 is brought into the second shifting position 17, while the second clutch 15 remains in the first shifting position 19. In this case the transmission ratio $i=i_3$ is present between the first electric motor 3 and the output shaft 6.

At high load (the rotational load moment is greater than the torque threshold) and low rotational speed, the first electric motor 3 as well as the second electric motor 4 are operatively connected with the output shaft 6. For this purpose the clutches 14 and 15 are brought into the third shifting position 18 and the second shifting position 20. Both electric motors 3 and 4 are thus operatively connected with the output shaft 6 via the connecting shaft 10, the countershaft 11 and the intermediate shaft 12, wherein respectively a transmission ratio of $i=i_1 \square i_2 \square i_3$ is present. The fourth operating mode is now present, which corresponds to a first acceleration operating mode.

When the rotational speed is increased for example above the second rotational speed threshold, the first clutch 14 is brought into the second shifting position 17 to reduce the rotational speed of the first electric motor 3, while the second clutch 15 remains in the second shifting position 20. Correspondingly the first electric motor 3 is directly operatively connected with the intermediate shaft 12, while the second electric motor 4 is only indirectly operatively connected with the intermediate shaft via the connecting shaft 10 and the countershaft 11. Correspondingly a transmission ratio of $i=i_3$ is present between the first electric motor 3 and the output shaft 6 and between the second electric motor 4 and the output shaft a transmission ration of $i=i_1 \cdot i_2 \cdot i_3$. The electric motors 3 and 4 thus can be operated at different rotational speeds so that for example the different properties of the differently constructed electric motors 3 and 4 are taken into account. In this case the aforementioned third operating mode is present, which corresponds to a second acceleration operating mode.

For accelerating the motor vehicle it is provided that first the first acceleration operating mode corresponding to the fourth operating mode is present. The first electric motor 3 as well as the second electric motor are operated with their respective maximal torque. When the rotational speed in increased preferably the rotational speed of the first electric motor 3 is preferably reduced at the above described second rotational speed threshold. For this purpose it is switched from the first acceleration operating mode into the second acceleration operating mode according to the third operating mode described above Both electric motors 3 and 4 are thus operatively connected with the output shaft 6 via the connecting shaft 10, the countershaft 11 and the intermediate shaft 12, wherein respectively a transmission ratio $i=i_1 \cdot i_2 \cdot i_3$ is present. The fourth operating mode is present, which corresponds to a first acceleration operating mode. During this switching traction is interrupted because the operative connection between the first electric motor 3 and the output shaft 6 is interrupted for a defined switching time period.

In order to at least partially compensate this interruption of traction, it is provided that the second electric motor 4 is operated during the switching time period with an overload torque, which is greater than the second maximal torque. Immediately after the switching or immediately after expiration of the switching time period the torque of the second electric motor 4 is to be however reduced again to below the second maximal torque in order to avoid load-related damage to the second electric motor 4. The used overload torque is in particular selected in dependence on the duration of the switching time period. In addition, however, further variables can be taken in to account such as in particular an ambient temperature and/or the temperature of the second electric motor 4.

In the described manner a torque can be provided in a completely interruption-free or at least almost interruption-free manner by means of the drive device 1 during acceleration of the motor vehicle. The otherwise occurring interruption of traction, which the driver of the motor vehicle perceives as unpleasant, is thus partially or even completely avoided.

What is claimed is:

1. A method for operating a drive device of a motor vehicle, comprising:
   providing a drive device having an output shaft operatively connected with at least one wheel of the motor vehicle, a first electric motor, a second electric motor and a manual transmission device, said manual transmission device having an intermediate shaft operatively connected with the output shaft, and a countershaft;
   operating a first clutch of the manual transmission device in a first shifting position, a second shifting position and a third shifting position and operating a second clutch of the manual transmission device in a first shifting position and a second shifting position, such that a transmission ratio in the second shifting position of the first clutch is produced between the first electric motor and the output shaft characterized by $i=i_3$ and in the third shifting position characterized by $i=i_1 \cdot i_2 \cdot i_3$;
   operating the first electric motor with a first maximal torque and the second electric motor with a second maximal torque, for accelerating the motor vehicle;
   operating the drive device in a first acceleration operating mode in which the first electric motor and the second electric motor are operatively connected with the intermediate shaft via the countershaft;
   operating the drive device in a second acceleration operating mode in which the first electric motor is directly operatively connected with the intermediate shaft, and the second electric motor is indirectly operatively connected with the intermediate shaft via the countershaft, wherein during a switching between the first acceleration operating mode and the second acceleration operating mode, the operative connection between the first electric motor and the intermediate shaft is interrupted for a defined switching time period;
   selecting the first maximal torque and/or the second maximal torque so as to completely compensate for a torque of the first electric motor during the switching; and
   during the switching time period operating the second electric motor with an overload torque greater than the second maximal torque, thereby at least partially compensating for the torque provided by the first electric motor.

2. The method of claim 1, further comprising immediately after the switching between the first and second operating mode, reducing the torque of the second electric motor.

3. The method of claim 1, wherein the torque of the second electric motor is reduced to or below the second maximal torque.

4. The method of claim 1, wherein the overload torque is selected as a function of a duration of the switching time period.

5. The method of claim 1, further comprising constantly determining a permanent operating torque, the first maximal torque, the second maximal torque and the overload torque for each of the first and second electric motors.

6. The method of claim 5, wherein the first maximal torque or the second maximal torque are selected to be at least 25% greater than the permanent operating torque of the first or second electric motor.

7. The method of claim 5, wherein the first maximal torque or the second maximal torque are selected to be at least 50% greater than the permanent operating torque of the first or second electric motor.

8. The method of claim 5, wherein the first maximal torque or the second maximal torque are selected to be at least 75% greater than the permanent operating torque of the first or second electric motor.

9. The method of claim 5, wherein the first maximal torque or the second maximal torque are selected to be at least 100% greater than the permanent operating torque of the first or second electric motor.

10. The method of claim 5, wherein the overload torque is selected to be at least 25%, greater than the permanent operating torque of the first or second electric motor.

11. The method of claim 5, wherein the overload torque is selected to be at least 50% greater than the permanent operating torque of the first or second electric motor.

12. The method of claim 5, wherein the overload torque is selected to be at least 75% greater than the permanent operating torque of the first or second electric motor.

13. The method of claim 5, wherein the overload torque is selected to be at least 100% greater than the permanent operating torque of the first or second electric motor.

14. A drive device of a motor vehicle, in particular for implementing the method of claim 1, said drive device comprising:

an output shaft operatively connected with at least one wheel of the motor vehicle;

a first electric motor and a second electric motor, said drive device being configured to operate the first electric motor with a first maximal torque and the second electric motor with a second maximal torque, for accelerating the motor vehicle;

a manual transmission device having an intermediate shaft and a countershaft, said intermediate shaft being operatively connected with the output shaft, and a first clutch of the manual transmission device operated in a first shifting position, a second shifting position and a third shifting position and a second clutch of the manual transmission device operated in a first shifting position and a second shifting position, such that a transmission ratio is produced in the second shifting position of the first clutch between the first electric motor and the output shaft characterized by $i=i_3$ and in the third shifting position characterized by $i=i_1 \cdot i_2 \cdot i_3$, wherein in a first acceleration operating mode of the drive device the first electric motor and the second electric motor are operatively connected with the intermediate shaft via the countershaft, and in a second acceleration operating mode of the drive device the first electric motor is directly operatively connected with the intermediate shaft, and the second electric motor is indirectly operatively connected with the intermediate shaft via the countershaft, wherein the drive device is configured for a switching between the first acceleration operating mode and the second acceleration operating mode, wherein during said switching the operative connection between the first electric motor and the intermediate shaft is interrupted for a defined switching time period, said first maximal torque and/or said second maximal torque being selected so as to completely compensate for a torque of the first electric motor during the switching, said drive device being configured to operate the second electric motor during the switching time period with an overload torque greater than the second maximal torque, for at least partially compensating for the torque provided by the first electric motor.

15. The drive device of claim 14, wherein the first clutch is assigned to the first electric motor, wherein the first shifting position of the first clutch is configured as a freewheel position, wherein in the second shifting position of the first clutch the first electric motor is directly operatively connected to the intermediate shaft, and in the third shifting position of the first clutch the first electric motor is operatively connected to the intermediate shaft via the countershaft.

16. The drive device of claim 14, further comprising a second clutch assigned to the second electric motor, wherein a first shifting position of the second clutch is configured as freewheel position, and wherein in a second shifting position of the second clutch the second electric motor is operatively connected to the and the intermediate shaft via the countershaft.

* * * * *

UNITED STATES PATENT AND TRADEMARK OFFICE
CERTIFICATE OF CORRECTION

PATENT NO. : 9,878,638 B2
APPLICATION NO. : 14/787096
DATED : January 30, 2018
INVENTOR(S) : Michael Wein and Karl-Heinz Meitinger It is certified that error appears in the above-identified patent and that said Letters Patent is hereby corrected as shown below:

On the Title Page

Under Foreign Patent Documents, replace "DE 2006 009 296 A1 9/2007" with --DE 10 2006 009 296 A1 9/2007--, on page 2 replace "DE 2009 007 972 U1 9/2012" with --DE 20 2009 007 972 U1 9/2012--, and replace "DE 2011 005 451 A1 9/2012" with --DE 10 2011 005 451 A1 9/2012--, and replace "DE 2013 005 721 A1 10/2014" with --DE 10 2013 005 721 A1 10/2014--.

Signed and Sealed this
Twenty-fourth Day of April, 2018

Andrei Iancu
*Director of the United States Patent and Trademark Office*